United States Patent [19]

Yamazaki et al.

[11] Patent Number: 4,926,265
[45] Date of Patent: May 15, 1990

[54] APPARATUS AND METHOD FOR PREVENTING PAPER INTERFERENCE IN A RECORDING DEVICE

[75] Inventors: Kiyoshi Yamazaki; Muneki Chuubachi, both of Hino, Japan

[73] Assignee: Kabushiki Kaisha Toshiba, Japan

[21] Appl. No.: 296,597

[22] Filed: Jan. 13, 1989

[30] Foreign Application Priority Data

Jan. 13, 1988 [JP] Japan .................. 63-2737[U]

[51] Int. Cl.$^5$ .............................. H04N 1/21
[52] U.S. Cl. ...................... 358/304; 346/24; 355/310
[58] Field of Search .......... 355/310; 358/304; 346/24; 162/270, 271

[56] References Cited

U.S. PATENT DOCUMENTS 4,165,512  8/1979  Peterson ................... 346/24

Primary Examiner—Leo P. Picard
Assistant Examiner—Lincoln Donovan
Attorney, Agent, or Firm—Banner, Birch, McKie & Beckett

[57] ABSTRACT

A recording apparatus such as a facsimile machine records information on recording paper having a curved characteristic, such as a roll of recording paper. After recording, the recording paper is cut by a cutting device. A wedge-shaped plate, which functions as a jam prevention device, supports the rear end of stacked sheets of cut recording paper below the cutting position of the cutting device. Since the rear end of the lower side of the cut recording paper is supported by the jam prevention device along at least a portion of its curled length, even if the cut recording paper has a strong tendency to curl, the next sheet of recording paper slides on the previously cut recording paper because it is securely supported by the jam prevention device. This significantly reduces the likelihood of interference between the previously cut recording paper and the next sheet of recording paper, even if the recording paper has a strong tendency to curl.

18 Claims, 4 Drawing Sheets

APPARATUS AND METHOD FOR PREVENTING PAPER INTERFERENCE IN A RECORDING DEVICE

CROSS REFERENCE TO RELATED APPLICATIONS

This application is related by subject matter to applicants' copending application Ser. No. 018,553 filed on Feb. 25, 1987 and entitled "Apparatus and Method for Transporting and Cutting a Recording Medium," and applicants' copending application Ser. No. 042,829 filed on Apr. 27, 1987 and entitled "Apparatus for Preventing Paper Clogging in a Recording Device."

BACKGROUND OF THE INVENTION

1. Field of the Invention

The present invention relates to a recording apparatus such as a facsimile machine and, more particularly, to an apparatus and method for transporting, cutting and supporting a recording medium.

2. Description of the Prior Art

As is well known, recording apparatus such as facsimile machines and other printers frequently use a roll of recording paper as the printing or recording medium. A typical prior art recording apparatus is shown in FIG. 1. Recording paper is unrolled from roll 1, transported past thermal recording head 3 by platen roller 2 and information is recorded on the unrolled paper by recording head 3. After completion of the recording operation, the recording paper is further transported a predetermined distance by roller 2 and a cutting operation is performed by automatic cutting device 4. Guide plate 6 guides the recording paper from cutting device 4 past discharge space 7. Cut sheets of paper 1a then are stored in storage tray 5. The most convenient position for storage tray 5 is immediately adjacent cutting device 4 since the cut recorded paper can fall immediately into tray 5.

A recurring problem with recording devices arranged in the above manner is that the cut recorded paper does not always stack flatly in storage tray 5, which frequently causes jamming of the recording apparatus. This problem is particularly acute when roll 1 of the recording paper has been substantially depleted, and the diameter of the roll is small. As the diameter of roll 1 is reduced, the recording paper has a greater tendency to curl, i.e., it has a greater curved characteristic. When recording paper having a greater curved characteristic is cut and stacked on storage tray 5, it curls up as shown in FIG. 2. When cut paper 1a curls up, the rear end (or end adjacent the recording apparatus) of cut paper 1a moves forward away from the recording apparatus at a distance from cutting device 4. Additionally, before the recording paper is cut by cutting device 4, the front end of the recording paper which first passes through cutting device 4 before the cutting operation, moves downward immediately due to the strong curve characteristic of the paper itself. Additionally, the front end of the uncut recording paper exiting cutting device 4 frequently strikes the curled up paper 1a on tray 5 as further illustrated in FIG. 2. After the recording paper exiting cutting device 4 is cut, the interaction between the stacked curled paper and the curled paper exiting cutting device 4 sometimes causes the newly cut paper exiting cutting device 4 to move back into cutting device 4, thereby clogging up the paper flow and frequently resulting in repetitive cutting of the paper.

Many prior art devices attempt to solve the above problem by using feed rollers adjacent the cutting device to transport a cut section of recording paper to a paper tray located some distance from the cutting device. In this way, the cut paper cannot clog the cutting device. Although use of feed rollers helps eliminate the problem of paper clogging, several new and equally disturbing problems arise. Use of feed rollers beyond the cutting device requires that the tray and the cutting device be some distance apart which makes it difficult to manufacture a compact recording device. As the technology of recording devices has improved, the size of these devices has decreased. The use of feed rollers places an unwanted limitation on the size of the device. The use of feed rollers also increases the cost of production and increases the overall complexity of the device, which further necessitates additional maintenance and repair.

SUMMARY OF THE INVENTION

It is the primary object of the present invention to provide a compact and low cost recording apparatus and method capable of transporting and cutting a recording medium without paper clogging and jamming at the cutting device due to curling of the cut paper.

It is another object of the invention to provide a recording apparatus and method that will cut each section of a recording medium only once.

It is a further object of the invention to provide a recording apparatus and method that does not require feed rollers to transport cut recording paper to a storage tray.

According to the present invention, a recording apparatus and method is provided which is capable of transporting recording paper to an output tray without use of any feed rollers between the cutting device and the tray and without an undue risk that the paper will become clogged and jammed in the cutting device. The recording apparatus includes a recording head for recording information on recording paper having a curved characteristic, such as a roll of recording paper. After information is recorded on the recording paper, the recording paper is moved forward a predetermined distance so that the rearmost end of the recording paper can be cut by a cutting device. At least one transport roller transports the recorded paper to the cutting device and wedge-shaped plate which functions as a jam prevention device. The jam prevention device supports the rear end of stacked sheets of cut recording paper below the cutting position of the cutting device. Since the rear end of the lower side of the cut recording paper is supported by the jam prevention device along at least a portion of its curled length, even if the cut recording paper has a strong tendency to curl (i.e., it has a strong curved characteristic), the next sheet of recording paper slides on the previously cut recording paper supported by the jam prevention device to reduce the likelihood of interference between the previously cut recording paper and the next sheet of recording paper.

DETAILED DESCRIPTION OF THE PREFERRED EMBODIMENTS

Figure 1:
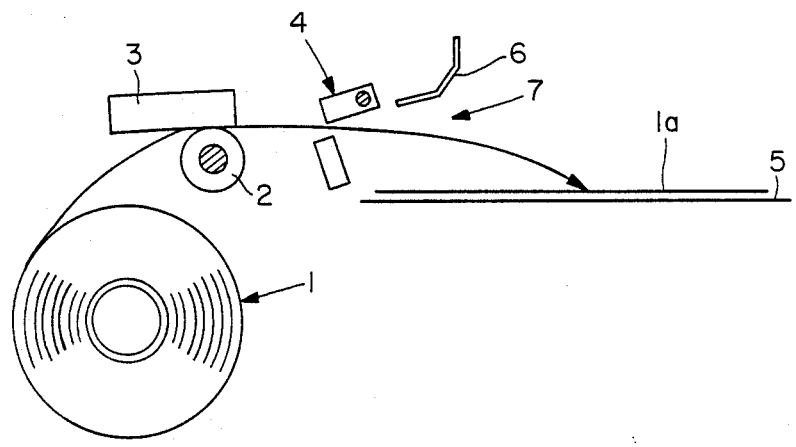
FIG. 1 is a block diagram showing a conventional recording apparatus.
Figure 2:
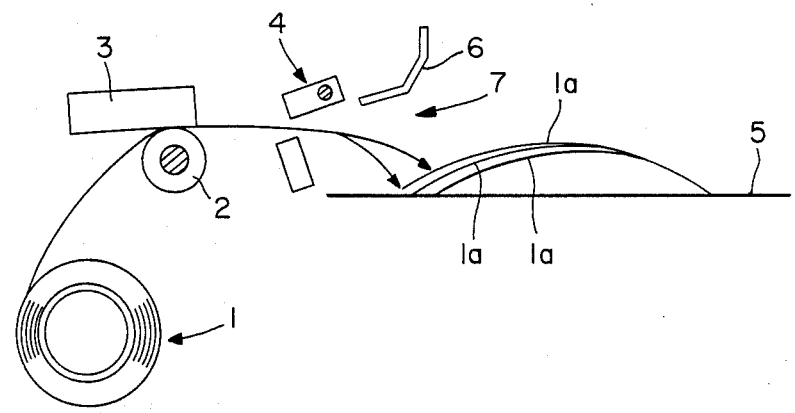
FIG. 2 is a block diagram showing the recording operation of the apparatus of FIG. 1.
Figure 3:
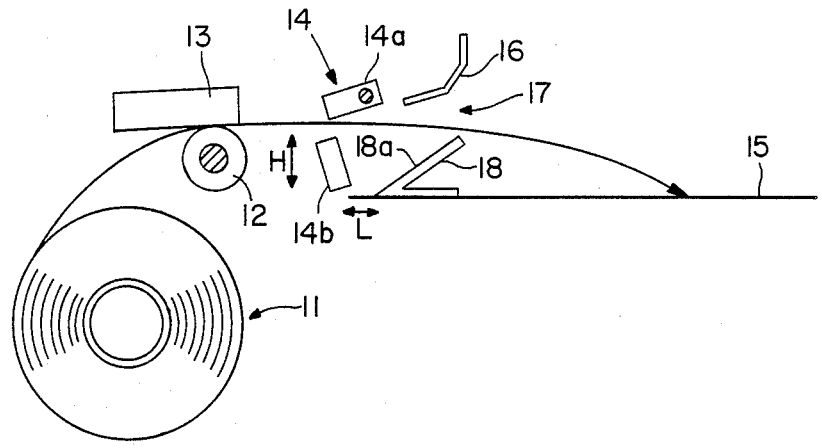
FIG. 3 is a block diagram showing a preferred embodiment of the recording apparatus according to the present invention.

A preferred embodiment of the recording apparatus of the present invention is shown in FIG. 3. This recording apparatus includes a casing (not shown) which supports a thermosensitive roll of recording paper 11 having a curved characteristic, platen roller 12, thermal recording head 13, rotary cutter 14 and guide plate 16. For illustrative purposes, the invention is described in terms of a facsimile machine, but the invention is not so limited in that the invention is applicable to other forms of recording apparatus.

A cover frame (not shown) for the casing may be provided which has a hinged construction so that platen roller 12 can be brought into contact with recording head 13 when the cover frame is closed. Recording paper unrolled from the roll of recording paper 11 is held between platen roller 12 and recording head 13. The recording paper is transported when platen roller 12 is rotated by a step motor and gears.

Rotary cutter 14 includes rotary blade 14a and stationary blade 14b. The recording paper is positioned between blades 14a and 14b and is cut by a downward turn of rotary blade 14a. After cutting the recording paper, rotary blade 14a returns to its initial position. In the initial position, there is a narrow space between blades 14a and 14b.

The recording apparatus further includes storage tray 15 which is horizontally positioned just beyond cutter 14. The recording paper cut off from the roll of recording paper is discharged and stored in tray 15. Discharge space 17 permits the recording paper to pass from cutter 14 to tray 15.

Figure 5:
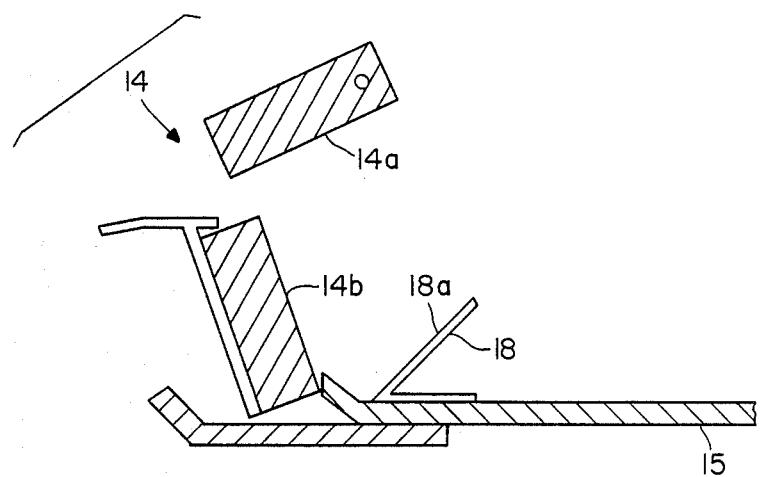
FIG. 5 is an expanded cross-sectional view of a portion of the apparatus of FIG. 1.

The recording apparatus also includes wedge-shaped plate 18 installed just beyond cutter 14 on tray 15 by screws as best illustrated in FIG. 5. Wedge-shaped plate 18 may be formed of a metal or other material. Sloping surface 18a of wedge-shaped plate 18 has a gentle slope with respect to the direction of movement of the recording paper through cutter 14. In a preferred embodiment, slope surface 18a makes an angle of about 45° with respect to horizon. The vertical distance H between blade 14a and tray 15 is about 20 mm and the horizontal distance L between the forward-most edge of blade 14b and a rear edge of wedge-shaped plate 18 is about 5 mm. Furthermore, the length of sloping surface 18a of plate 18 is about 20 mm.

Figure 4:
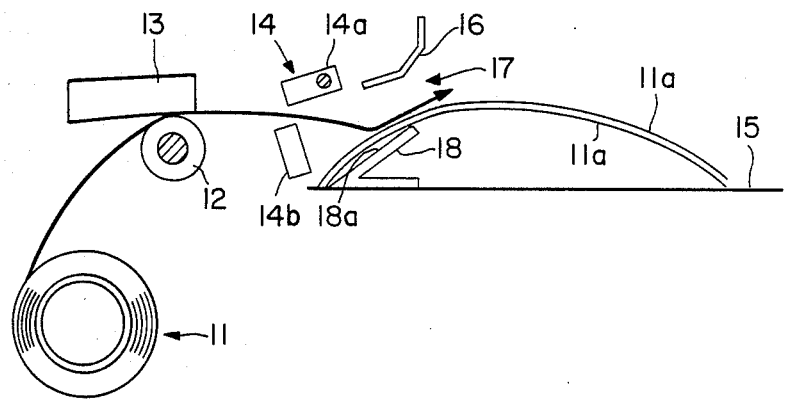
FIG. 4 is a block diagram showing the recording operation of the apparatus of FIG. 3.

The operation of the facsimile machine of FIGS. 3–5 will now be described. In an initial state (i.e., a waiting state), the front-most end of the uncut recording paper is positioned in cutter 14. When the facsimile machine receives control and information signals from another facsimile machine, it uses the control signals to decode and demodulate the information signals thereby producing recording signals. The control circuitry used to perform these operations is well known and is not described herein. In response to the above signals, platen roller 14 rotates in a counter-clockwise direction for a predetermined period in order to move the recording paper back toward recording head 13 so that the portion of the recording paper which previously passed over recording head 13 is not wasted. The recording operation then is carried out.

As the lines of recording signals are supplied to recording head 13, platen roller 12 simultaneously rotates in a clockwise direction in synchronism with each line of recording information to move the recording paper forward. Thereafter, the recording paper with lines of information recorded thereon is transported through cutter 14. When the control circuitry determines that one page has been completed, recording signals are no longer supplied to recording head 13. However, platen roller 12 continues to rotate for a predetermined period so that the desired cutting point of the recording paper moves to the cutting position of cutter 14. The recording paper then is cut at the cutting point. After cutting, the rear end of the cut recording paper drops against wedge-shaped plate 18, and is supported close below the cutting position. Of course, the front end of the cut recording paper rests on tray 15 because the front end is beyond wedge-shaped plate 18.

If more recording signals are not received, the extended end of the roll of recording paper is moved back a short distance since it is not desirable to leave the paper immediately adjacent cutter 14 while waiting for the next recording operation. If the paper is left adjacent cutter 14, cutter 14 may become clogged due to build up of short strips of paper caused by incorrect actuation of cutter 14. Cutter 14 may also rust if kept in direct contact with the coated material on the recording paper for long periods of time.

On the other hand, if more recording signals are received, the extended end of the roll of recording paper is moved back to the starting position of the recording operation, and the next recording operation is carried out. If there is a previously cut section of paper on tray 15 and wedge-shaped plate 18 while the next recording operation is carried out, the extended end of the roll of recording paper strikes the previously cut section. Since the rear end of the previously cut section is supported close below cutter 14, the extended end of the roll of recording paper does not strike the rear-most end of the previously cut section. Also, since the wedge-shaped plate 18 contacts the lower side of the cut recording paper along at least a portion of its length, particularly when the cut paper is curled, a greater frictional force occurs between the wedge-shaped plate 18 and the cut recording paper which provides more secure support than a flat tray and keeps the cut recording paper in place. Accordingly, the next section of the recording paper to exit cutter 14 slides on the previously cut section of recording paper supported by wedge-shaped plate 18 as illustrated in FIG. 4.

The smaller roll 11 of the recording paper becomes during use, i.e., the smaller the diameter of roll 11, the greater the tendency of the recording paper to curl, i.e., the stronger the curved characteristic of the recording paper. However, since the rear end of the cut section or sheet of recording paper is supported close below cutter 14 by wedge-shaped plate 18, the curled sections of recording paper exiting cutter 14 are controlled and stacked by plate 18 even as the tendency of the recording paper to curl increases. Thus, every cut section or sheet of recording paper is supported in a stacked position.

In prior art apparatus, when a cut section or sheet of recording paper is pushed back into cutter 14, the next sheet of recording paper frequently collides with the previously cut sheet and causes a paper clog or jam in the cutter. To the contrary in the present invention, as can be clearly seen in FIG. 4, the sheet of paper moving through cutter 14 is not forced back into cutter 14 by the stack of cut recording paper 11a. Wedge-shaped plate 18 prevents jamming and clogging of cutter 14 by passing each new sheet of recording paper over stack 11a, and it also prevents repetitive cutting of sheets of recorded paper by keeping cut sheets away from cutter 14 and stacked on tray 15.

Figure 6:
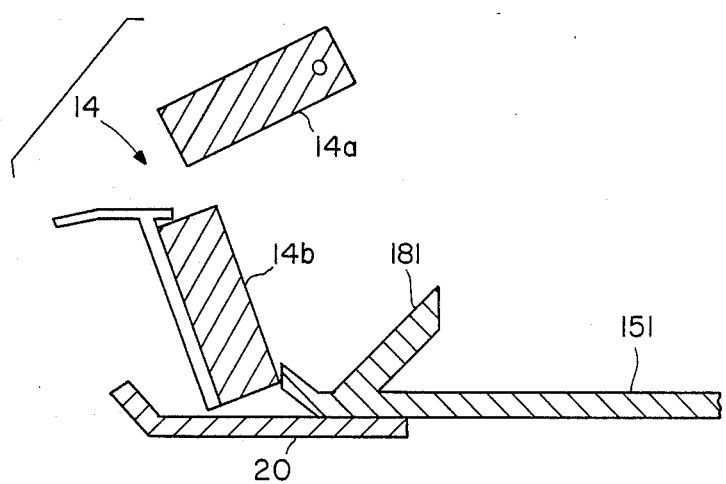
FIG. 6 is a cross-sectional view of a second embodiment of the recording apparatus according to the present invention.
Figure 7:
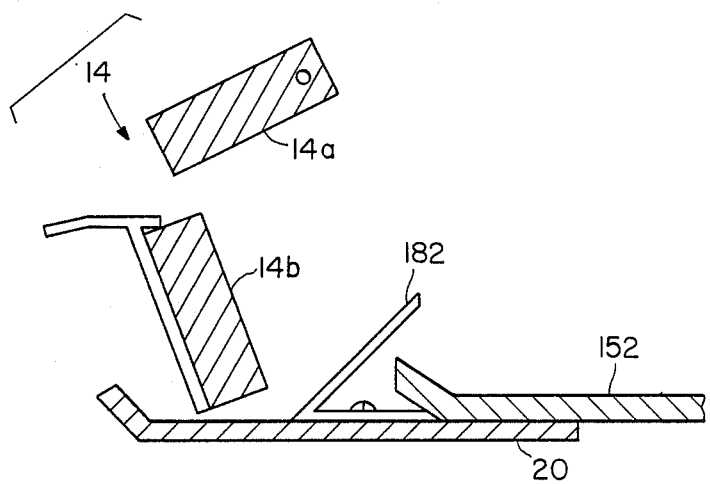
FIG. 7 is a cross-sectional view of a third embodiment of the recording apparatus according to the present invention.
Figure 8:
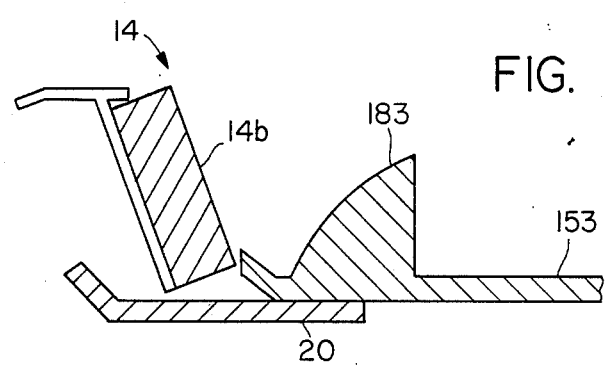
FIG. 8 is a cross-sectional view of a fourth embodiment of the recording apparatus according to the present invention.

The structure of wedge-shaped plate 18 may be varied as shown by the embodiments in FIGS. 6, 7 and 8. In FIG. 6, tray 151 includes integral sloped plate 181 positioned like wedge-shaped plate 18 shown in FIG. 5. Tray 151 is installed just beyond cutter 14 on casing 20 by screws. FIG. 7 shows metallic wedge-shaped plate 182 installed just beyond cutter 14 on casing 20 by screws. In this embodiment, tray 152 is installed just beyond plate 182. FIG. 8 shows tray 153 having an integral sloped plate 183 with a curved surface rather than a straight surface as shown in FIG. 6.

Various changes may be made within the purview of this invention in the form, details, proportions and arrangement of parts without departing from the spirit of the invention, and no undue limitations are to be inferred or implied from the foregoing disclosure.

We claim:

1. A recording apparatus for recording information on a recording medium having a curved characteristic, said recording apparatus comprising:
   recording means for recording information on a section of the recording medium thereby forming a recorded section;
   cutting means for cutting off the recorded section of the recording medium at a cutting position;
   transporting means for transporting the recorded section of the recording medium from said recording means to said cutting means; and
   support means adjacent said cutting means for guiding the recorded section exiting said cutting means and for supporting the rear end of previously cut off recorded sections, said support means being wedge-shaped with a surface extendable along at least a portion of the rear end of cut off recorded sections to prevent the curling of any cut off recorded sections from interfering with the operation of said cutting means.

2. A recording apparatus according to claim 1 wherein the recording medium comprises a roll of recording paper.

3. A recording apparatus according to claim 1 wherein the recording medium comprises a roll of recording paper, and said transporting means further transports the recording medium from the roll of recording paper to said recording means.

4. A recording apparatus according to claim 1 wherein said cutting means includes an upper blade and a lower blade spaced from said upper blade, one of said blades being movably engageable with the other of said blades for cutting the recording medium.

5. A recording apparatus according to claim 4 wherein said upper blade is movable and said lower blade is stationary.

6. A recording apparatus according to claim 1 wherein said support means is positioned closely adjacent said cutting means and below the cutting position of said cutting means.

7. A recording apparatus according to claims 1 or 6 wherein said support surface of said support means is a flat surface which extends upwardly in the direction of travel of the recorded section as it exits said cutting means.

8. A recording apparatus according to claim 7 wherein the length of said flat surface and the angle thereof to the horizontal are selected to position said support means along at least a portion of the rear end of the cut off recorded sections and within cut off recorded sections having a tendency to curl.

9. A recording apparatus according to claim 8 wherein the length of said flat surface is approximately 20 mm and the angle is approximately 45°.

10. A recording apparatus to claim 6 wherein said support surface of said support means is a convexly curved surface extending along a portion of the path of travel of the recorded section as it exits said cutting means.

11. A recording apparatus according to claim 10 wherein the length of said convexly curved surface and the height thereof are selected to position said support means along at least a portion of the rear end of the cut off recorded sections and within cut off recorded sections having a tendency to curl.

12. A recording apparatus according to claim 1 further comprising a tray adjacent said cutting means for storing the cut off recorded sections of the recording medium.

13. A recording apparatus according to claim 12 wherein said support means is mounted between said cutting means and said tray.

14. A recording apparatus according to claim 12 wherein said support means is an integral part of said tray.

15. A recording apparatus according to claim 12 wherein said support means is mounted on said tray.

16. A recording apparatus to claim 12 further comprising a frame, said support means being mounted on said frame close below the cutting position of said cutting means to support the rear end of cut off recorded sections.

17. A recording apparatus for recording information on a recording medium having a curved characteristic, said recording apparatus comprising:
   recording means for recording information on a section of the recording medium thereby forming a recorded section;
   cutting means for cutting off the recorded section of the recording medium at a cutting position;
   transporting means for transporting the recorded section of the recording medium from said recording means to said cutting means; and
   jam prevention means adjacent said cutting means for directing the recorded section exiting said cutting means away from said cutting means and stacking the rear ends of previously cut off recorded sections, said jam prevention means further preventing any previously cut off recorded sections from pushing the recorded section exiting the cutting means back into the cutting means due to the tendency of the recorded sections to curl, said jam prevention means having a surface positionable in frictional contact with a lengthwise portion of the rear end lower surfaces of the cut off recorded sections stacked thereon to secure any such sections subject to curling.

18. A method of transporting a recording medium having a curved characteristic in a recording device, the method comprising the steps of:

recording information on a section of the recording medium to thereby form a recorded section;

transporting the recorded section of the recording medium to a cutting device;

cutting off the recorded section of the recording medium at a cutting position of said cutting device;

supporting a lengthwise portion of the rear end of the lower side of the cut off recorded section at a position close below the cutting position and along an inclined surface to prevent cut off recorded sections subject to curling from interfering with the operation of said cutting device; and stacking the cut off recorded sections.

* * * * *